(12) United States Patent
Suzuki

(10) Patent No.: US 7,098,402 B2
(45) Date of Patent: Aug. 29, 2006

(54) GROMMET

(75) Inventor: Takashi Suzuki, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 11/257,013

(22) Filed: Oct. 25, 2005

(65) Prior Publication Data

US 2006/0086524 A1  Apr. 27, 2006

(30) Foreign Application Priority Data

Oct. 26, 2004  (JP) .............................. 2004-310423

(51) Int. Cl.
*H02G 3/18* (2006.01)

(52) U.S. Cl. .............. 174/65 G; 174/65 R; 174/152 G; 174/153 G; 16/2.1; 277/607

(58) Field of Classification Search .............. 174/65 G, 174/65 R, 152, 153 G; 16/2.1, 2.2; 277/606, 277/607

See application file for complete search history.

(56) References Cited

U.S. PATENT DOCUMENTS

| 6,339,196 | B1 | 1/2002 | Uchida |
| 6,376,777 | B1 | 4/2002 | Ito et al. |
| 6,685,195 | B1 * | 2/2004 | Uchida et al. .............. 277/628 |
| 6,825,416 | B1 | 11/2004 | Okuhara |
| 6,897,380 | B1 | 5/2005 | Sakata et al. |

FOREIGN PATENT DOCUMENTS

JP  2001-132871  5/2001

* cited by examiner

*Primary Examiner*—Dhiru R. Patel
(74) *Attorney, Agent, or Firm*—Greenblum & Bernstein, P.L.C.

(57) ABSTRACT

A grommet is mounted on a wire harness and inserted and latched into a vehicle panel aperture having a circular arc section at each corner. The grommet has a small tubular portion and a large tubular portion fitting the aperture. The large tubular portion has an annular latch groove having a concave shape on an outer peripheral surface at a predetermined distance from an end. Of two side walls that sandwich a groove base of the latch groove, a first side wall has a height from the groove base greater in straight sections than in arc sections to allow the straight sections to catch a periphery of the aperture more deeply than the arc sections.

20 Claims, 7 Drawing Sheets

GROMMET

CROSS-REFERENCE TO RELATED APPLICATIONS

The present disclosure relates to subject matter contained in priority Japanese Application No. 2004-310423, filed on Oct. 26, 2004, which is herein expressly incorporated by reference in its entirety.

BACKGROUND OF THE INVENTION

1. Field of the Invention

The present invention relates to a grommet that reduces the insertion force to attach the grommet to a panel having an aperture, such as a vehicle body panel, while maintaining holding force after attachment to the panel.

2. Description of Related Art

A grommet made of an elastic material, including rubber and elastomer, is mounted on a wire harness routed from an engine compartment to a passenger cabin or a wire harness passed between a body panel and a door panel of a vehicle. The grommet is then attached to the panel at an aperture. The grommet is designed to protect the wire harness passed through the aperture, to shield the cabin from water, dust and noise from the engine compartment or to keep water and dust from entering the body panel or the door panel.

For a grommet of the above described type, it is required both to provide a low insertion force necessary to attach the grommet to the panel at the aperture and to provide a high holding or gripping force after the grommet has been attached. When attached to a wire harness routed between a body panel and a door panel in particular, the grommet is pushed into the aperture from the exterior, not pulled from inside the panel. Therefore, it would be an improvement to lower the insertion force in the pushing operation.

Figure 7A:
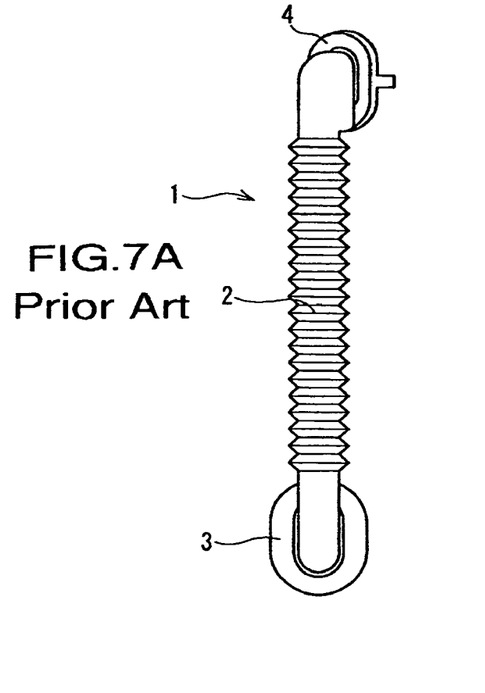
FIGS. 7A, 7B, and 7C show a conventional example of a grommet.
Figure 7B:
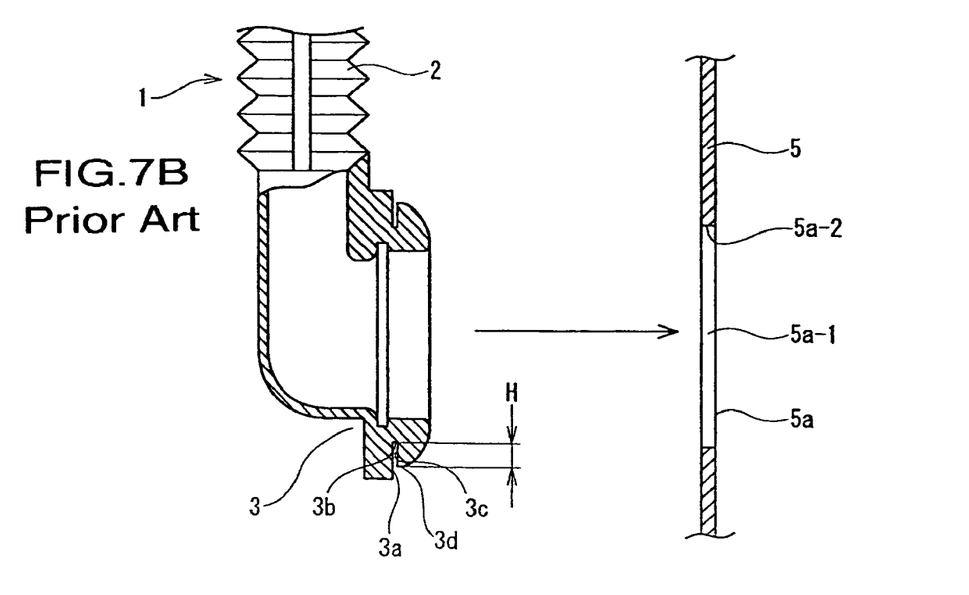
Figure 7C:
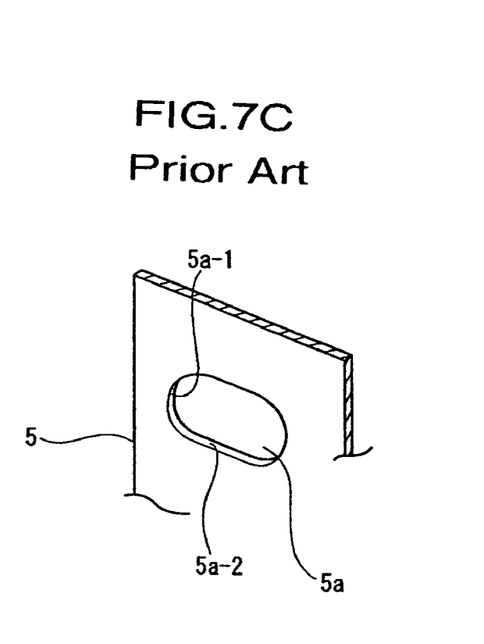

The applicant has presented in Japanese Patent Laid-open Publication No. 2001-132871 and others a grommet shown in FIGS. 7A–7C mounted on a wire harness routed between a body panel and a door panel and then pushed into an aperture in the body panel for attachment. Grommet 1 has elongated narrow tubular portion 2 and wide tubular portions 3 and 4 on ends thereof. One of the wide tubular portions fits into oval aperture 5a in body panel 5; the other wide tubular portion fits into an aperture in a door panel (not shown in the figure). Annular body latch groove 3a has a concave shape on an outer peripheral surface of wide tubular portion 3 (a body latch groove on wide tubular portion 4 is not shown in the figure). Groove bottom 3b of body latch groove 3a is sandwiched between two side walls. One of the side walls, side wall 3c on the insertion side of large tubular portion 3, has uniform height H from groove bottom 3b to upper end 3d along an entire periphery. When grommet 1 is pushed and latched into aperture 5a in body panel 5, upper end 3d of the side wall of wide tubular portion 3 passes through a periphery of aperture 5a and body latch groove 3a fits into the periphery of aperture 5a.

When an aperture in a body panel is elongated, not round, wide tubular portion 3 of grommet 1 is also formed elongated as shown in a cross sectional view, similar to the shape of the aperture. Likewise, an annular body latch groove on wide tubular portion 3 is provided having an elongated shape. Therefore, side wall 3c of the body latch groove that catches the aperture includes a straight section and a circular arc section. When a pulling force is exerted on a wire harness having a grommet inserted therein and side wall 3c of the body latch groove latched into oval aperture 5a in body panel 5, the straight section of side wall 3c catching straight section 5a-2 disengages more easily from aperture 5a than the circular arc section of side wall 3c catching circular arc section 5a-1. A conventional grommet, therefore, has height H from groove bottom 3b to upper end 3d of side wall 3c catching the periphery of aperture 5a and predetermined so as not to allow side wall 3c to get loose in straight section 5a-2 and so as to be uniform along its entire periphery.

As described above, however, the section of the grommet catching circular arc section 5a-1 of the aperture is less likely to come loose than straight section 5a-2. Thus, the circular arc section of side wall 3c of the grommet has a latching and holding force that is greater than required. Furthermore, when inserting and latching wide tubular portion 3 of grommet 1 into oval aperture 5a, an excessive insertion force is required as the grommet has the side wall height in the circular arc section beyond that which is necessary. Normally, latching operations include one circular arc section of the body latch groove of the oval grommet is first latched into circular arc section 5a-1 of aperture 5a; then straight sections on both sides are latched to straight sections 5a-2 of the aperture; and finally the other circular arc section is inserted and latched into the circular arc section of the aperture. The final step that latches the circular arc section requires the maximum insertion force. Lowering the height of the side wall to reduce the grommet insertion force, however, decreases the holding force in the straight sections, leading to easy separation of the grommet from the panel having the aperture. Thus, conflicting issues arise herein: reducing the grommet insertion force weakens the holding force; maintaining the holding force does not reduce the insertion force. The issues apply not only to an oval aperture, but also to an aperture in a polygonal shape having a circular arc at each corner, to which the grommet is attached.

SUMMARY OF THE INVENTION

The present invention is provided to address the above described problems. An object of the present invention is to reduce the insertion force while not lowering the holding force of a grommet attached to a panel aperture having a shape including straight and circular arc sections.

An aspect of the present invention provides a grommet for insertion into a panel aperture having straight sections and arc sections, the grommet including a first tubular portion being configured for insertion into the panel aperture, the first tubular portion having an outer periphery with straight sections and arc sections; a second tubular portion provided adjacent the first tubular portion; an annular latch groove provided on an outer peripheral surface of the first tubular portion at a predetermined distance from an insertion end thereof; the annular latch groove including a first side wall adjacent the insertion end; a second side wall opposite the first side wall; and a groove bottom between the first side wall and the second side wall; the first side wall having a first height from the groove bottom in the straight sections and a second height from the groove bottom in the arc sections, the height in the straight sections being greater than the height in the arc sections, wherein the first side wall at the straight sections catches the periphery of the aperture more deeply than at the arc sections.

In a further aspect of the present invention, the outer peripheral surface of the first tubular portion from an upper end of the first side wall to the insertion end of the first tubular portion has a narrowing diameter, tapering from the upper end of the first side wall toward the insertion end; and a first taper angle in the straight sections is different from a second taper angle in the arc sections to provide the first side wall with a height in the straight sections greater than the height of the first side wall in the arc sections. Further, the second side wall has a uniform height from the groove bottom along the outer peripheral surface of the first tubular portion. Additionally, the ratio of the first height in the straight sections to the second height in the arc sections of the first side wall is in the range of 3:2 to 4:3. The first tubular portion includes an outer peripheral shape including one of an oval and a polygon having arc sections at corners thereof. The panel aperture includes a shape substantially the same as the outer peripheral shape of the first tubular portion; and the first tubular portion has a larger cross section than the second tubular portion. Further, the grommet is formed of an elastic material; and the grommet may include a seal lip projecting from an outer peripheral end of the second side wall.

A further aspect of the present invention provides a method of inserting a grommet into a panel aperture having straight sections and arc sections, the method including providing a grommet including a first tubular portion being configured for insertion into the panel aperture, the first tubular portion having an outer periphery with straight sections and arc sections; a second tubular portion provided adjacent the first tubular portion; an annular latch groove provided on an outer peripheral surface of the first tubular portion at a predetermined distance from an insertion end thereof; the annular latch groove including a first side wall adjacent the insertion end; a second side wall opposite the first side wall; and a groove bottom between the first side wall and the second side wall; the first side wall having a first height from the groove bottom in the straight sections and a second height from the groove bottom in the arc sections, the height in the straight sections being greater than the height in the arc sections, wherein the first side wall at the straight sections catches the periphery of the aperture more deeply than at the arc sections; fitting the latch groove at a first of the curved sections of the first tubular portion into the periphery of the panel aperture; fitting the latch groove at the straight sections of the first tubular portion into the periphery of the panel aperture; and fitting the latch groove of a second of the curved sections of the first tubular portion into the periphery of the panel aperture. Further, the method includes providing a seal lip projecting from an outer peripheral end of the second side wall; and tightly fitting the seal lip to the periphery of the panel aperture.

A further aspect of the present invention provides a grommet inserted into a panel aperture having straight sections and arc sections, the grommet including a first tubular portion, the first tubular portion having an outer periphery with straight sections and arc sections, the first tubular portion being inserted into the panel aperture having straight sections and arc sections; a second tubular portion provided adjacent the first tubular portion; an annular latch groove provided on an outer peripheral surface of the first tubular portion at a predetermined distance from an insertion end thereof; the annular latch groove including a first side wall adjacent the insertion end; a second side wall opposite the first side wall; and a groove bottom between the first side wall and the second side wall; the first side wall having a first height from the groove bottom in the straight sections and a second height from the groove bottom in the arc sections, the height in the straight sections being greater than the height in the arc sections, wherein the first side wall at the straight sections catches the periphery of the aperture more deeply than at the arc sections. Further, the grommet is mounted on a wire harness and the panel is a vehicle body panel.

According to the structure above, the height from the groove bottom of the first side wall on the insertion side of the large tubular portion is not uniform over the entire periphery, namely lower in the circular arc sections than in the straight sections. The structure thereby reduces the insertion force when inserting and latching the last circular arc section of the body latch groove into an aperture formed in a panel. Specifically, when the large tubular portion of the grommet is inserted to attach to an oval aperture in the panel, the upper end of the first side wall provided along the entire periphery of the large tubular portion is not inserted into the aperture at one time, but inserted in the order of one circular arc section, straight sections on both sides and the other circular section. The insertion order is almost the same for a polygonal shape having circular arcs at corners: the last inserted section is the circular arc section. A high insertion force is then required to insert the last section since other sections of the body latch groove are already fitted into the periphery of the aperture and the large tubular portion is not flexible. The grommet provided in the present invention has a low height in the circular arc sections that require the high insertion force, thereby allowing the circular arc sections to easily pass through the periphery of the aperture and reducing the insertion force. A height from the groove bottom of the first side wall in the straight sections, on the other hand, is set higher than that in the circular arc sections, since the straight sections more easily separate or disengage from the aperture in the panel, thereby providing a higher holding force than in the circular arc sections while not lowering the grommet holding force. As described above, the grommet according to the present invention allows reduction in the grommet insertion force as well as retention of the holding force after attachment to the aperture.

In particular, a grommet attached to a door harness routed on the door side and pulled out to the body side, the grommet inserted and latched to an oval aperture in a body panel, has conventionally required an excessive insertion force and caused a burden on workers. The grommet in the present invention is best suitable for solving the problem.

A grommet having multiple circular arc sections, that is, a grommet attached to an oval aperture, has a pair of straight sections and a pair of circular arc sections. To reduce the insertion force for the last inserted section when attaching the grommet, the height in only one of the pair of circular arc sections, that is, the circular arc section last inserted and latched needs to be low; not the entire height in the circular arc sections needs to be low. Setting only one section height low, however, limits flexibility to insert the grommet, thus deteriorating the workability. Therefore, it is preferable that all circular arc sections have a lower height than the straight sections when a grommet has multiple circular arc sections.

The outer peripheral surface from the upper end of the first side wall standing from the groove bottom of the body latch groove to the end side of the large tubular portion has a narrowing diameter, tapering toward the end side. It is preferable to change a taper angle to set different heights to the straight sections and to the circular arc sections of the first side wall. Specifically, while a width (thickness) of the insertion side of the large tubular portion is uniform along the entire periphery, the taper angle from an outer periphery of the end side is different by section to set the height from the groove bottom of the first side wall differently to the straight sections and circular arc sections.

It is preferable that a second side wall, opposite to the first side wall having the groove bottom therebetween, has a constant height from the groove bottom throughout the peripheral direction. Not passing through an aperture, the second side wall has no impact on insertion force, thus needs no height difference between the straight sections and the circular arc sections. Rather, it is desirable to have the constant height throughout the peripheral direction. According to the structure above, the first and second side walls securely sandwich and hold the periphery of the aperture, even in the circular arc sections of the first side wall where the height from the groove bottom is set low. The structure thus reinforces the holding force of the grommet in the circular arc sections as well, preventing the grommet from coming off from the panel.

Height H1 in the straight sections and height H2 in the circular arc sections of the first side wall are preferably set to H1:H2=3:2 to 4:3. The height ratio is identified through the inventor's experiments. When a height difference is larger than the height ratio, the straight sections become higher, requiring a higher insertion force; or the circular arc sections become too low, substantially degrading the holding force and likely to get loose. Meanwhile, a height difference smaller than the height ratio has only limited effectiveness in improving the insertion force for the circular arc sections.

According to the present invention as described above, the grommet has the height from the groove bottom of the first side wall on the insertion end side of the larger tubular portion not uniform along the periphery, that is, lower in the circular arc sections than in the straight sections, which reduces the insertion force for the circular arc sections. Due to the shape that reduces the insertion force, therefore, when inserting and latching the grommet into a aperture, such as an oval shaped aperture, having circular arc and straight sections formed in a panel, a circular arc section, the section last inserted and latched and requiring the maximum insertion force, requires less maximum grommet insertion force. Meanwhile, the height from the groove bottom is higher in the straight sections than in the circular arc sections, since the straight sections tend to detach from the aperture when a pulling force is exerted to a wire harness while the grommet is attached to the aperture. Thereby, the straight sections are provided with deeper latch depth to the periphery of the aperture, strengthening the holding force of the grommet and ensuring prevention of separation or disengagement from the panel. As described above, the grommet according to the present invention meets the conflicting requirements: to decrease the insertion force and to increase the holding force.

BRIEF DESCRIPTION OF THE DRAWINGS

The above, and other objects, features and advantages of the present invention will be made apparent from the following description of the preferred embodiments, given as nonlimiting examples, with reference to the accompanying drawings in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The following describes preferred embodiments of the present invention with reference to the drawings. FIGS. 1 to 4, 5A, and 5B show an embodiment of the present invention, in which grommet 10 made of a suitable elastic material, such as, for example, rubber or an elastomer, is mounted on wire harness W/H. The wire harness W/H may be of any suitable type such as, for example, a door harness passing between a body panel 20 and a side door (not shown) of a vehicle.

Figure 1:
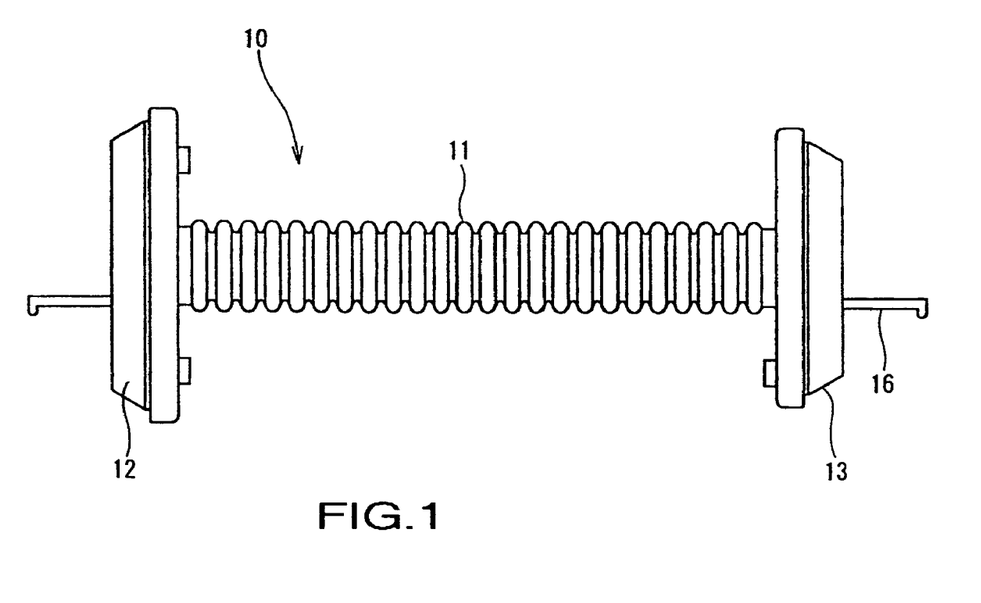
FIG. 1 is a front view of a grommet according to an embodiment of the present invention.
Figure 2:
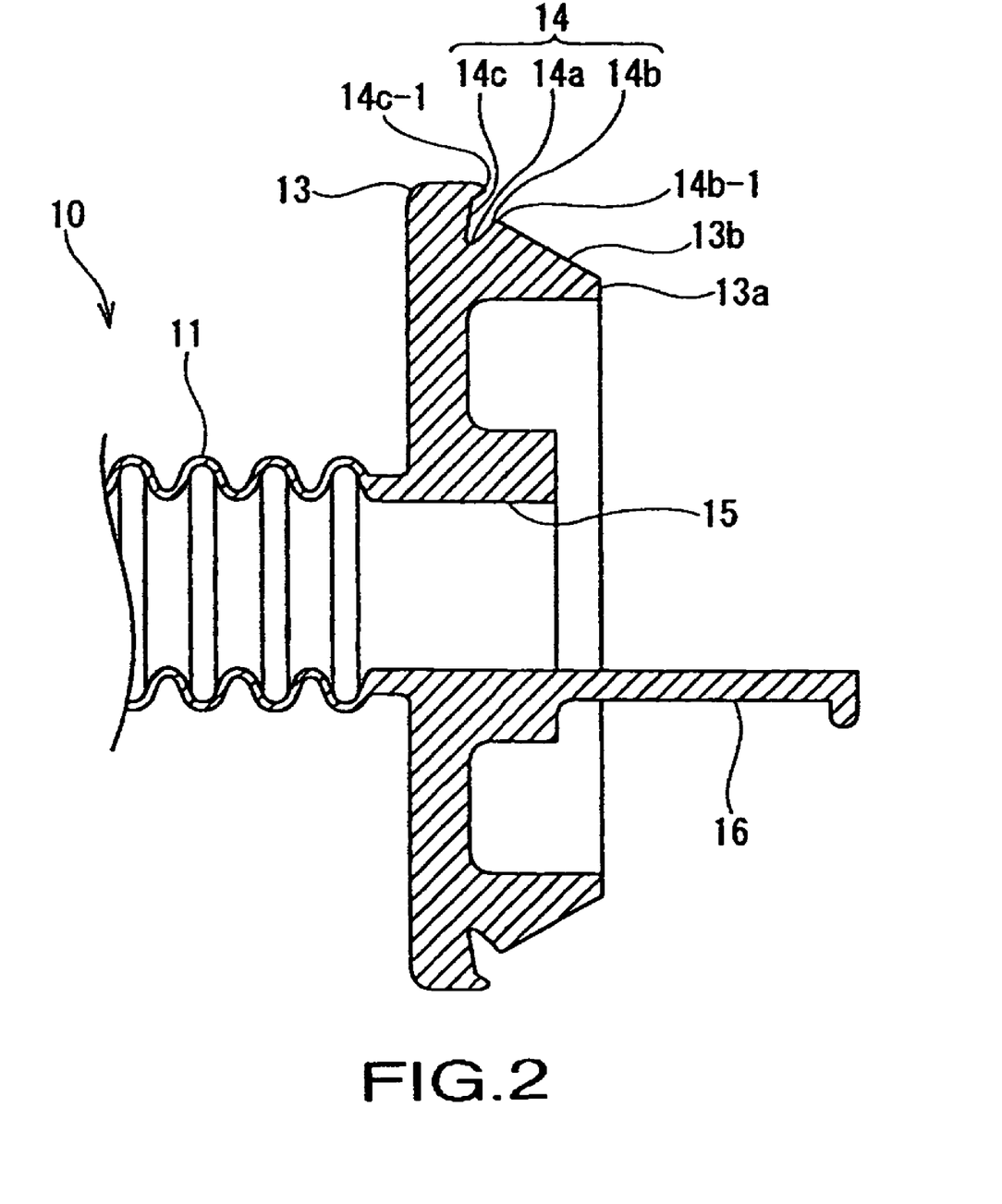
FIG. 2 is a partial cross-sectional view of a large tubular portion of the grommet of FIG. 1.

As shown in FIG. 1, grommet 10 includes a small corrugated tubular portion 11, which stretches along the axial direction of wire bundle W of wire harness W/H, and large tubular portions 12 and 13 provided at opposite ends of small tubular portion 11. Large tubular portion 13 fitted into aperture 21 in body panel 20, as shown in FIG. 2, has annular body latch groove 14 having a concave shape and provided on an outer peripheral surface of the large tubular portion 13 at a predetermined distance from end 13a. Two side walls sandwich groove bottom or base 14a of body latch groove 14; a first side wall 14b proximate the end 13a and a second side wall 14c opposite to first side wall 14b having groove base 14a therebetween. Outer peripheral surface 13b has a diameter that narrows from upper end 14b-1 of first side wall 14b to end 13a, tapering toward end 13a. Large tubular portion 13 has wire outlet 15 at the center and taping tab 16 projecting from the periphery of wire outlet 15. Large tubular portion 12 fitted into an aperture in another panel has substantially the same structure, having a larger outer periphery than large tubular portion 13.

Figure 4:
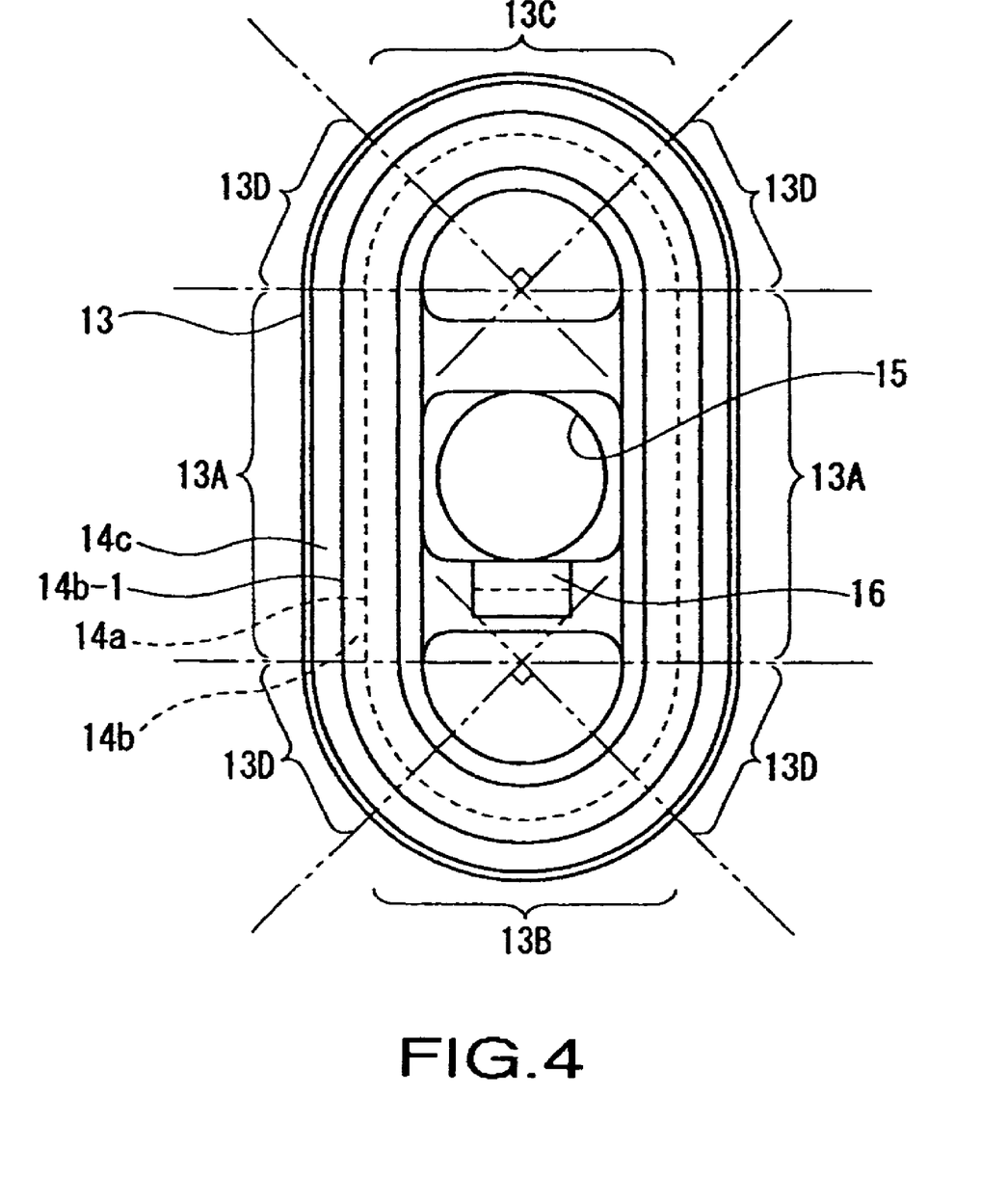
FIG. 4 is an end view of the large tubular portion of the grommet of FIG. 1.

Aperture 21 provided in body panel 20 has a substantially oval shape having straight sections and circular arc sections. Large tubular portion 13 fitted into aperture 21 has a shape similar to aperture 21 as shown in FIG. 4, that is, an oval shape having a pair of straight sections 13A and 13A, upper circular arc section 13C and lower circular arc section 13B.

Figure 3A:
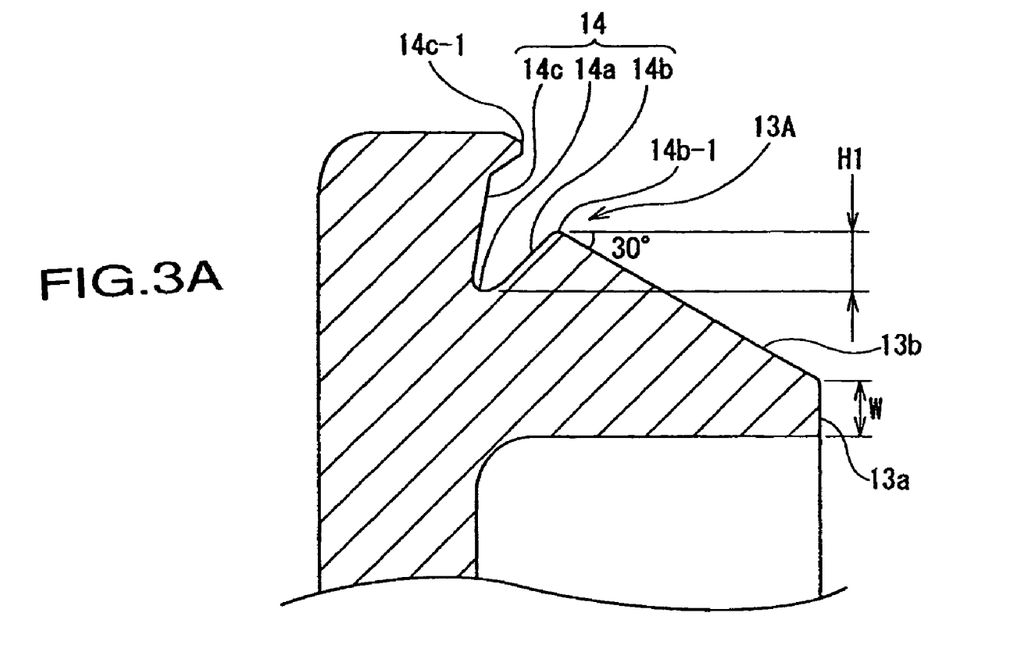
FIG. 3A is an enlarged partial cross-sectional view of a straight section of the large tubular portion of the grommet of FIG. 1.
Figure 3B:
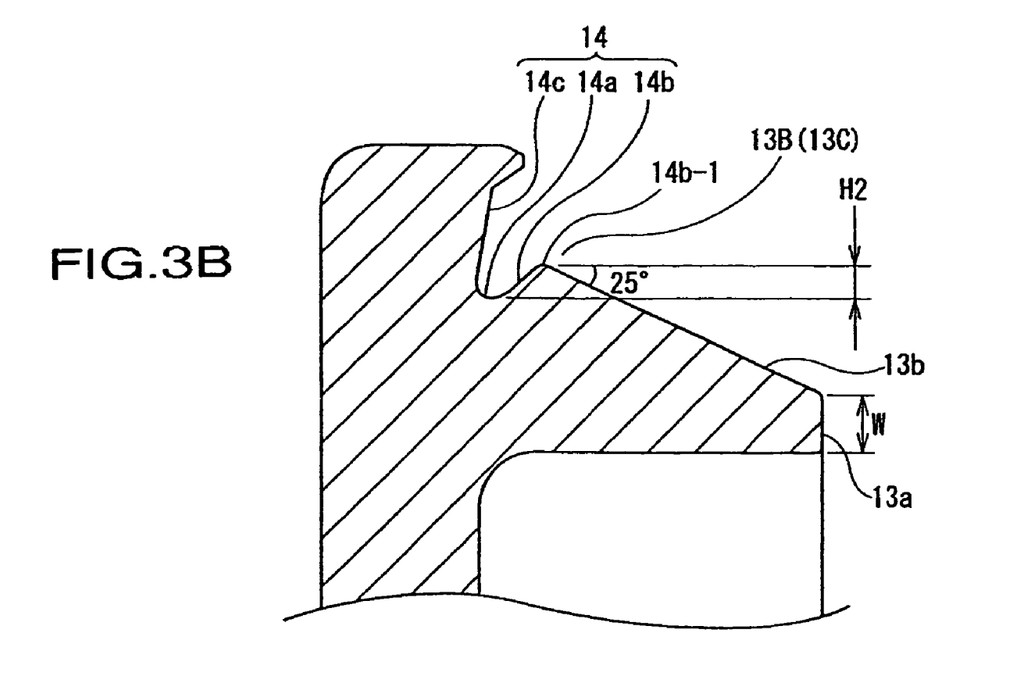
FIG. 3B is an enlarged partial cross-sectional view of a circular arc section of the large tubular portion of the grommet of FIG. 1.

Of the two side walls 14b, 14c opposed in the axial direction and sandwiching body latch groove 14 of large tubular portion 13, the height of the first side wall 14b on insertion end 13a is defined as the distance, in a radial direction substantially perpendicular to the axial direction, from the groove base 14a to upper end 14b-1. The height H1 from groove base 14a to upper end 14b-1 of the first side wall 14b in straight sections 13A is different from the height H2 from groove base 14a to upper end 14b-1 of the first side wall 14b in lower circular arc section 13B and upper circular section 13C. In particular, height H1 of first side wall 14b in straight sections 13A is greater than height H2 of first side wall 14b in circular arc sections 13B and 13C. More particularly, the heights H1 and H2 may have suitable values, and in the present embodiment, the height H1 of first side wall 14b in straight sections 13A is 2.0 mm as shown in FIG. 3A, while height H2 of first side wall 14b in circular arc sections 13B and 13C is 1.5 mm as shown in FIG. 3B, so that height H1 of first side wall 14b in straight sections 13A is greater than height H2 of first side wall 14b in circular arc sections 13B and 13C in a suitable ratio and in the present invention the ratio is: H1:H2=4:3. The height of first side wall 14b in connecting sections 13D, which join lower circular arc section 13B, upper circular arc section 13C and straight sections 13A, gradually changes to be smooth. As described above, the height of first side wall 14b varies among straight section 13A, lower circular section 13B and upper circular arc section 13C, whereas width W of the insertion end of large tubular portion 13 is constant. Accordingly, the taper angle of outer peripheral surface 13b of large tubular portion 13 is different in the straight and circular arc sections. In this embodiment, the taper angle of outer peripheral surface 13b in straight sections 13A is approximately 30 degrees to the axial direction, while the taper angle of outer peripheral surface 13b in lower circular arc section 13B and upper circular arc section 13C is approximately 25 degrees to the axial direction.

Further, the height from groove base 14a of second side wall 14c on the small tubular portion side, opposite to first side wall 14b having groove base 14a therebetween, is uniform along the entire periphery. Seal lip 14c-1 is provided annularly, projecting from an outer peripheral end of second side wall 14c. Seal lip 14c-1 tightly fits an outer surface of body panel 20 when large tubular portion 13 is attached to aperture 21 in body panel 20.

Next, a method of inserting and latching grommet 10 into aperture 21 formed in body panel 20 is described. First, wire bundle W of wire harness W/H is passed through small tubular portion 11 of grommet 10. Then, wire bundle W pulled out through large tubular portions 12 and 13 at both ends is taped and fixed to taping tab 16. Thereby, grommet 10 is mounted on wire bundle W.

Figure 5A:
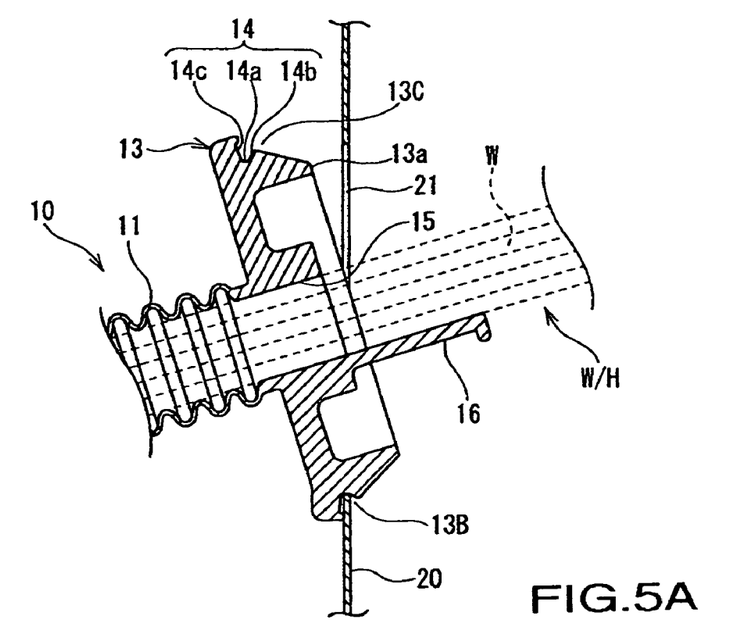
FIGS. 5A and 5B show a method of inserting and latching the grommet of FIG. 1 into a body panel.
Figure 5B:
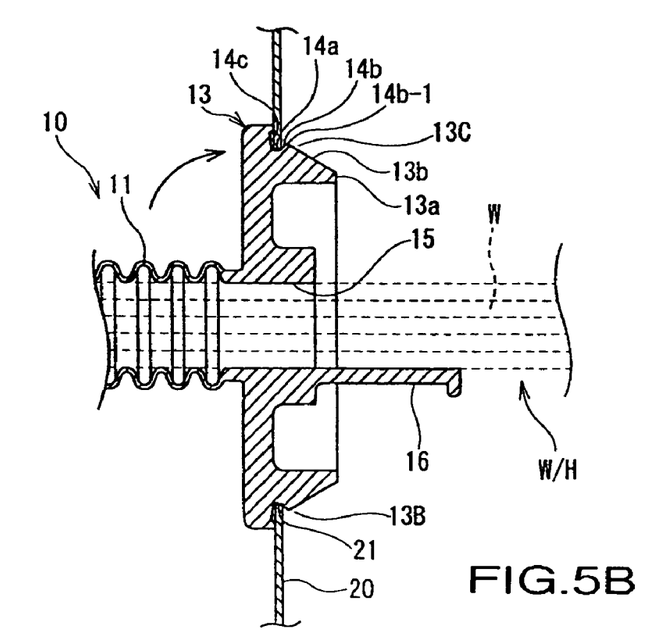

In the next routing process of wire harness W/H in a vehicle, a portion of wire harness W/H mounted with grommet 10 is pulled out from inside a panel through an aperture. The aperture may be formed in an end portion on a body panel side of a door panel. Large tubular portion 13 of grommet 10 is then pushed and latched into aperture 21 in body panel 20. Particularly, body latch groove 14 of lower circular arc section 13B of large tubular portion 13 is first fitted into a periphery of aperture 21 as shown in FIG. 5A. Then, straight sections 13A on right and left sides are inserted from the lower side and fitted into the periphery of aperture 21. Finally, upper circular arc section 13C is pushed in as shown in FIG. 5B, so that upper end 14b-1 of upper circular arc section 13C catches a periphery on the body side of aperture 21. In doing so, the entire periphery of body latch groove 14 of large tubular portion 13 fits into aperture 21 in body panel 20. In this condition, seal lip 14c-1 of second side wall 14c tightly fits the periphery of the outer surface of aperture 21.

According to the construction above, the height of first side wall 14b of large tubular portion 13 is not uniform along the entire periphery. The height H2 in upper circular arc section 13C is less than the height H1 in straight sections 13A. Therefore, when large tubular portion 13 is inserted and latched into aperture 21 in body panel 20, finally inserting upper end 14b-1 of upper circular arc section 13C into aperture 21 does not require a high insertion force, enabling insertion of the grommet with low insertion force. As described above, height H2 of first side wall 14b in upper circular arc section 13C, the last inserted section, is low to lower the insertion force, whereas height H1 of first side wall 14b in straight sections 13A and 13A, the sections which may loosen more easily is higher so that straight sections 13A catch the periphery of aperture 21 deeply. Therefore, straight sections 13A do not separate easily even when a pulling force is exerted on the wire harness. At the same time, the holding or gripping force of the grommet to body panel 20 is not lowered and negatively impacted.

Figure 6:
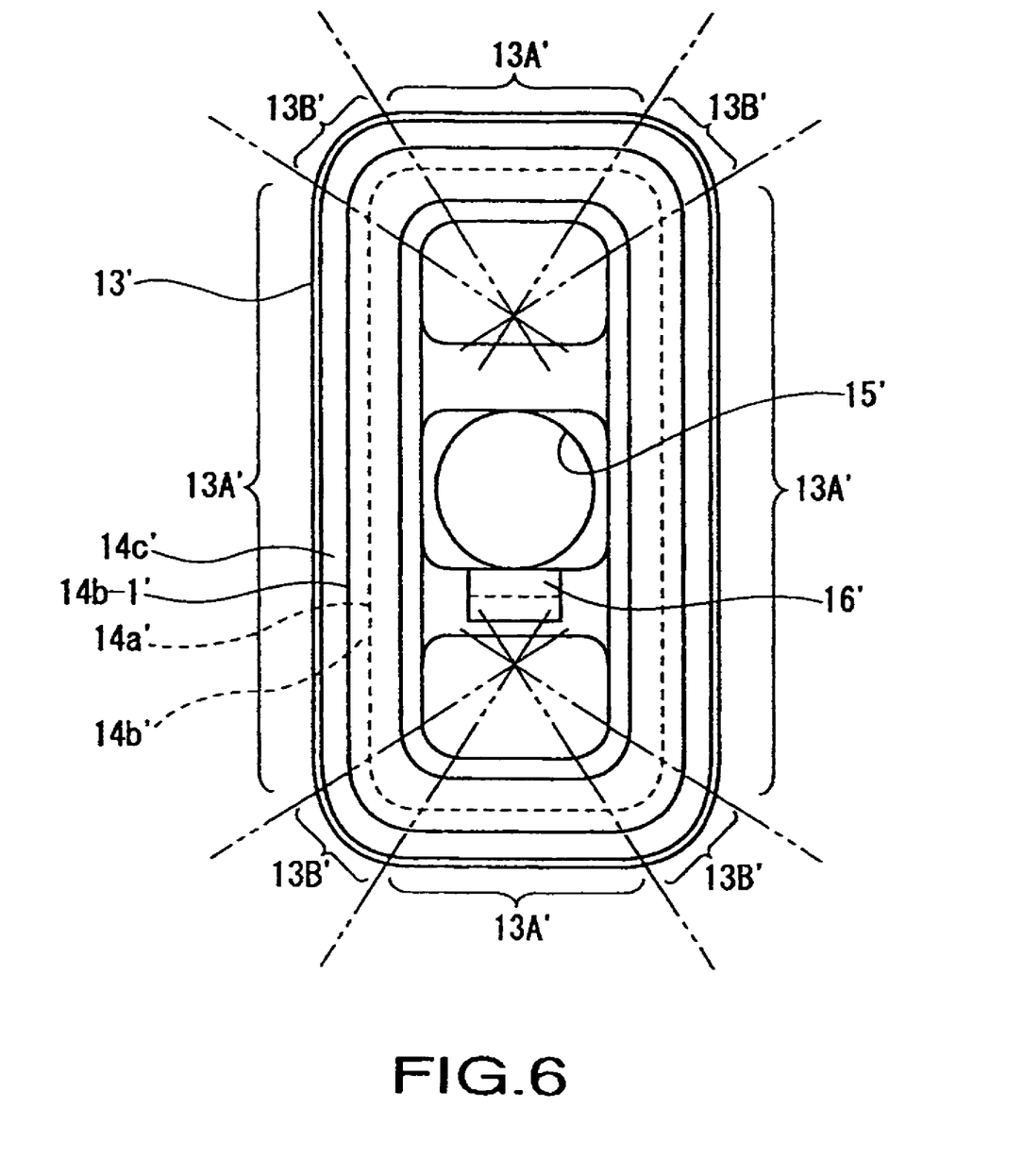
FIG. 6 shows a variation of a large tubular portion of a grommet.

FIG. 6 shows an example of a variation of the embodiment shown in FIGS. 1–4, 5A, and 5B. In the variation shown in FIG. 6, an aperture in a panel to which a grommet is attached has a rectangular shape, and large tubular portion 13' of the grommet will also have a similar rectangular shape having circular arc sections 13B' at four corners. In the variation example, height H2 of first side wall 14b' in circular arc sections 13B' is also lower than height H1 of first side wall 14b' in straight sections 13A'. Therefore, inserting circular arc section 13B', the last inserted section, into aperture 21 requires a low insertion force when large tubular portion 13' of grommet 10' is latched to aperture 21 in body panel 20. Further, the shape of the large tubular portion is not limited to a square or rectangle, but may be a polygon, including a triangle, a trapezoid and a pentagon, to which the same construction applies. The structure and effectiveness of other shapes are the same as described in the embodiment above; therefore, the same reference numerals apply and explanation is omitted.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

What is claimed is:

1. A grommet for insertion into a panel aperture having straight sections and arc sections, said grommet comprising:
   a first tubular portion being configured for insertion into the panel aperture, said first tubular portion having an outer periphery with straight sections and arc sections;
   a second tubular portion provided adjacent said first tubular portion;
   an annular latch groove provided on an outer peripheral surface of said first tubular portion at a predetermined distance from an insertion end thereof;
   said annular latch groove including:
      a first side wall adjacent said insertion end;
      a second side wall opposite said first side wall; and
      a groove bottom between said first side wall and said second side wall;
      said first side wall having a first height from said groove bottom in said straight sections and a second height from said groove bottom in said arc sections, said height in said straight sections being greater than said height in said arc sections, wherein said first side wall at said straight sections catches the periphery of the aperture more deeply than at said arc sections.

2. The grommet according to claim 1, wherein:

the outer peripheral surface of said first tubular portion from an upper end of said first side wall to said insertion end of said first tubular portion has a narrowing diameter, tapering from said upper end of said first side wall toward said insertion end; and a first taper angle in said straight sections is different from a second taper angle in said arc sections to provide said first side wall with a height in said straight sections greater than the height of said first side wall in said arc sections.

3. The grommet according to claim 1, wherein said second side wall has a uniform height from said groove bottom along said outer peripheral surface of said first tubular portion.

4. The grommet according to claim 1, wherein the ratio of said first height in said straight sections to said second height in said arc sections of said first side wall is in the range of 3:2 to 4:3.

5. The grommet according to claim 1, wherein said first tubular portion includes an outer peripheral shape including one of an oval and a polygon having arc sections at corners thereof.

6. The grommet according to claim 5, wherein the panel aperture includes a shape substantially the same as the outer peripheral shape of said first tubular portion.

7. The grommet according to claim 1 wherein said first tubular portion has a larger cross section than said second tubular portion.

8. The grommet according to claim 1, wherein said grommet is formed of an elastic material.

9. The grommet according to claim 1, further comprising:
a seal lip projecting from an outer peripheral end of said second side wall.

10. A method of inserting a grommet into a panel aperture having straight sections and arc sections, said method comprising:
providing a grommet including:
a first tubular portion being configured for insertion into the panel aperture, said first tubular portion having an outer periphery with straight sections and arc sections;
a second tubular portion provided adjacent said first tubular portion;
an annular latch groove provided on an outer peripheral surface of said first tubular portion at a predetermined distance from an insertion end thereof;
said annular latch groove including:
a first side wall adjacent said insertion end;
a second side wall opposite said first side wall; and
a groove bottom between said first side wall and said second side wall;
said first side wall having a first height from said groove bottom in said straight sections and a second height from said groove bottom in said arc sections, said height in said straight sections being greater than said height in said arc sections, wherein said first side wall at said straight sections catches the periphery of the aperture more deeply than at said arc sections;
fitting the latch groove at a first of said curved sections of said first tubular portion into the periphery of the panel aperture;

fitting the latch groove at said straight sections of said first tubular portion into the periphery of the panel aperture; and fitting the latch groove of a second of said curved sections of said first tubular portion into the periphery of the panel aperture.

11. The method according to claim 10, said method further comprising:
providing a seal lip projecting from an outer peripheral end of said second side wall; and
tightly fitting said seal lip to the periphery of the panel aperture.

12. A grommet inserted into a panel aperture having straight sections and arc sections, said grommet comprising:
a first tubular portion, said first tubular portion having an outer periphery with straight sections and arc sections, said first tubular portion being inserted into said panel aperture having straight sections and arc sections;
a second tubular portion provided adjacent said first tubular portion;
an annular latch groove provided on an outer peripheral surface of said first tubular portion at a predetermined distance from an insertion end thereof;
said annular latch groove including:
a first side wall adjacent said insertion end;
a second side wall opposite said first side wall; and
a groove bottom between said first side wall and said second side wall;
said first side wall having a first height from said groove bottom in said straight sections and a second height from said groove bottom in said arc sections, said height in said straight sections being greater than said height in said arc sections, wherein said first side wall at said straight sections catches said periphery of said aperture more deeply than at said arc sections.

13. The grommet according to claim 12, wherein:
the outer peripheral surface of said first tubular portion from an upper end of said first side wall to said insertion end of said first tubular portion has a narrowing diameter, tapering from said upper end of said first side wall toward said insertion end; and
a first taper angle in said straight sections is different from a second taper angle in said arc sections to provide said first side wall with a height in said straight sections greater than the height of said first side wall in said arc sections.

14. The grommet according to claim 12, wherein said second side wall has a uniform height from said groove bottom along said outer peripheral surface of said first tubular portion.

15. The grommet according to claim 12, wherein the ratio of said first height in said straight sections to said second height in said arc sections of said first side wall is in the range of 3:2 to 4:3.

16. The grommet according to claim 12, wherein said first tubular portion includes an outer peripheral shape including one of an oval and a polygon having arc sections at corners thereof, and said panel aperture includes a shape substantially the same as the outer peripheral shape of said first tubular portion.

17. The grommet according to claim 12, wherein said first tubular portion has a larger cross section than said second tubular portion.

18. The grommet according to claim 12, wherein said grommet is formed of an elastic material.

19. The grommet according to claim 12, wherein said grommet is mounted on a wire harness and said panel is a vehicle body panel.

20. The grommet according to claim 12, further comprising:

a seal lip projecting from an outer peripheral end of said second side wall, said seal lip tightly fitting the periphery of said panel aperture.

* * * * *